US009058679B2

(12) United States Patent
Mielekamp

(10) Patent No.: US 9,058,679 B2
(45) Date of Patent: Jun. 16, 2015

(54) VISUALIZATION OF ANATOMICAL DATA

(75) Inventor: Pieter Maria Mielekamp, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 854 days.

(21) Appl. No.: 12/679,957

(22) PCT Filed: Sep. 22, 2008

(86) PCT No.: PCT/IB2008/053838
§ 371 (c)(1),
(2), (4) Date: Mar. 25, 2010

(87) PCT Pub. No.: WO2009/040719
PCT Pub. Date: Apr. 2, 2009

(65) Prior Publication Data
US 2010/0194750 A1 Aug. 5, 2010

(30) Foreign Application Priority Data
Sep. 26, 2007 (EP) .................................... 07117257

(51) Int. Cl.
*G06T 17/00* (2006.01)
*G06T 19/00* (2011.01)
*G06T 15/08* (2011.01)
(52) U.S. Cl.
CPC ................. *G06T 19/00* (2013.01); *G06T 15/08* (2013.01); *G06T 2210/41* (2013.01)
(58) Field of Classification Search
USPC ........................................................ 345/424
See application file for complete search history.

(56) References Cited

U.S. PATENT DOCUMENTS

| 5,995,108 A | 11/1999 | Isobe |
| 7,801,346 B2 | 9/2010 | Shirahata |
| 2004/0249303 A1 | 12/2004 | Serra |
| 2005/0017972 A1* | 1/2005 | Poole et al. .................... 345/424 |

(Continued)

FOREIGN PATENT DOCUMENTS

| JP | 20096986 | 1/1997 |
| WO | 2004095378 A1 | 11/2004 |
| WO | 2005104954 A2 | 11/2005 |

(Continued)

OTHER PUBLICATIONS

Gering, David T., et al. "An integrated visualization system for surgical planning and guidance using image fusion and an open MR." Journal of Magnetic Resonance Imaging 13.6 (2001): 967-975.*

(Continued)

*Primary Examiner* — Mark Zimmerman
*Assistant Examiner* — Vu Nguyen

(57) ABSTRACT

An apparatus and a method for examination and visualization of an object of interest. The apparatus comprises a display, an input device, and a calculation unit, wherein the calculation unit is adapted for performing the following steps: acquiring a first data set; acquiring a second data set; fusing the first and second data sets; determining image parameters entered by means of the input device, related to at least one of an image plane, an angle of view, a contrast and a transparency; rendering an image on the basis of the data sets and the determined parameters, resulting in a combined image with selected areas of transparency and selected areas of visible contrast information, wherein the image is visualized on the display.

8 Claims, 6 Drawing Sheets

(56) References Cited

U.S. PATENT DOCUMENTS

2005/0228250 A1    10/2005    Bitter et al.
2009/0103793 A1*    4/2009    Borland et al. ............... 382/131

FOREIGN PATENT DOCUMENTS

WO      2006018774 A1    2/2006
WO      2006033377 A1    3/2006

OTHER PUBLICATIONS

Westermann, Rüdiger, and Thomas Ertl. "Efficiently using graphics hardware in volume rendering applications." Proceedings of the 25th annual conference on Computer graphics and interactive techniques. ACM, 1998.*

Ruijters, D., Babic, D., Homan, R., Mielekamp, P., ter Haar Romeny, B. M., & Suetens, P. (Mar. 2007). 3D multimodality roadmapping in neuroangiography. In Medical Imaging (pp. 65091F-65091F). International Society for Optics and Photonics.*

Gering: "A System for Surgical Planning and Guidance Using Image Fusion and Interventional MR"; Massachusetts Institute of Technology, Thesis, 1999, 106 Page Document.

Gering et al: "An Integrated Visualization System for Surgical Planning and Guidance Using Image Fusion and Open MR"; Journal of Magnetic Resonance Imaging, 2001, vol. 13, pp. 967-975.

Sommer et al: "An Interactive Visualization and Navigation Tool for Medical Volume Data"; Computers & Graphics, 1999, vol. 23, pp. 223-244.

Ruijters et al: "3D Multimodality Roadmapping in Neuroangiography"; Medical Imaging 2007: Visualization and Image-Guided Procedures, Proceedings of SPIE, vol. 6509, pp. 65091F-1-65091F-8.

Westermann et al: "Efficiently Using Graphics Hardware in Volume Rendering Applications"; Computer Graphics Proceedings 1998, pp. 169-177.

Bercier et al: "Multimodality Image Fusion for Radiosurgery Localisation of Large AVMs"; Proceedings of the 22nd Annual EMBS International Conference, Jul. 23-28, 2000, Chicago, IL., IEEE, vol. 4, pp. 2689-2692.

* cited by examiner

VISUALIZATION OF ANATOMICAL DATA

This invention relates generally to a visualization of an object of interest. Particularly, the invention relates to a visualization of anatomical data fused with vascular and/or interventional 2D/3D XRAY information. Concretely, the invention relates to an apparatus, a method, and a use of an apparatus for examination and visualization of an object of interest, as well as to a computer program product and a computer readable medium for controlling such an apparatus.

TECHNOLOGICAL BACKGROUND

The introduction of 3DRA and CT-like (XperCT, DynaCT or InnovaCT) imaging on a C-arm based X-ray device has positioned 3D rotational XRAY imaging more closely to the interventional environment.

Very often a diagnostic scanning, such as CT and MR will already be available prior to the intervention. Automatic 3D/3D registration of the CT/MR with the rotational data set, which can be performed in a few seconds, allows the fused visualization/interpretation of both data sets.

In FIG. 1, an exemplary diagram of a user interface illustrates a general layout of a user interface. Said user interface comprises different areas for displaying tool buttons 130 and application buttons 140. The user interface further comprises an image area. The image area displays one or more views in a certain arrangement depending on the selected layout configuration. Each view can show a 3D or a 2D image of an object of interest. Usually, the views 110 will show 3D images having different perspectives, wherein the 3D images are build by a combination of orthogonally arranged slices of, for example, CT data. The views 120 will show 2D images of slices used to create one of the 3D images. US 2005/0228250 A1 discloses such a user interface comprising an image area that is divided into a plurality of views for viewing corresponding 2-dimensional and 3-dimensional images of an anatomical region.

Because in the interventional context the clinician wants to focus on the intervention the imaging visualization/manipulation should be interactive, intuitive and simple. Furthermore the spatial relationship between the volume sets should easy be interpreted and segmentation complexity and overhead should be avoided.

SUMMARY OF THE INVENTION

An object of the invention is to provide a visualization of anatomical data by means of which images with a high resolution can be received. Provided with such images, the physician should be able to easily identify structures of interest and to localize said structures in the anatomical environment. Further, the physician should be able to monitor instruments which the physician uses in an interventional procedure.

This object is solved by the subject matter of the respective independent claims. Further exemplary embodiments are described in the respective dependent claims.

According to an exemplary embodiment, an apparatus for examination and visualization of an object of interest is provided, wherein the apparatus comprises, inter alia, a calculation unit adapted for performing the following steps: acquiring a first data set; acquiring a second data set; fusing the first and second data sets; determining image parameters related to at least one of an image plane, an angle of view, a contrast and a transparency; rendering an image on the basis of the data sets and the chosen parameters, resulting in a combined image with selected areas of transparency and selected areas of visible contrast information.

The first data set as well as the second data set might be selected from the group consisting of CT, MR, 3DRX and CT-like.

According to an aspect of the exemplary embodiment, the transparency and the contrast information of the image areas might depend on the depth of respective voxel information.

According to another aspect of the exemplary embodiment, the rendering of an image comprises setting up a stencil buffer, rendering contrast information that is situated behind an active slice, and drawing transparent soft tissue slices.

According to yet another aspect of the exemplary embodiment, the calculation unit is adapted for performing the further step of adding volume rendered context information to the image to be rendered.

These and other aspects of the invention will be apparent from and elucidated with reference to the embodiment described hereinafter.

BRIEF DESCRIPTION OF THE DRAWING

In the following, the invention will be described by means of an exemplary embodiment with regard to the attached figures.

DETAILED DESCRIPTION OF AN EXEMPLARY EMBODIMENT

In the following, the description will be focused on the visualization of a 3-dimensional image which could be illustrated, for example, at one of the 3D-imaging areas on a user interface as described above.

Figure 1:
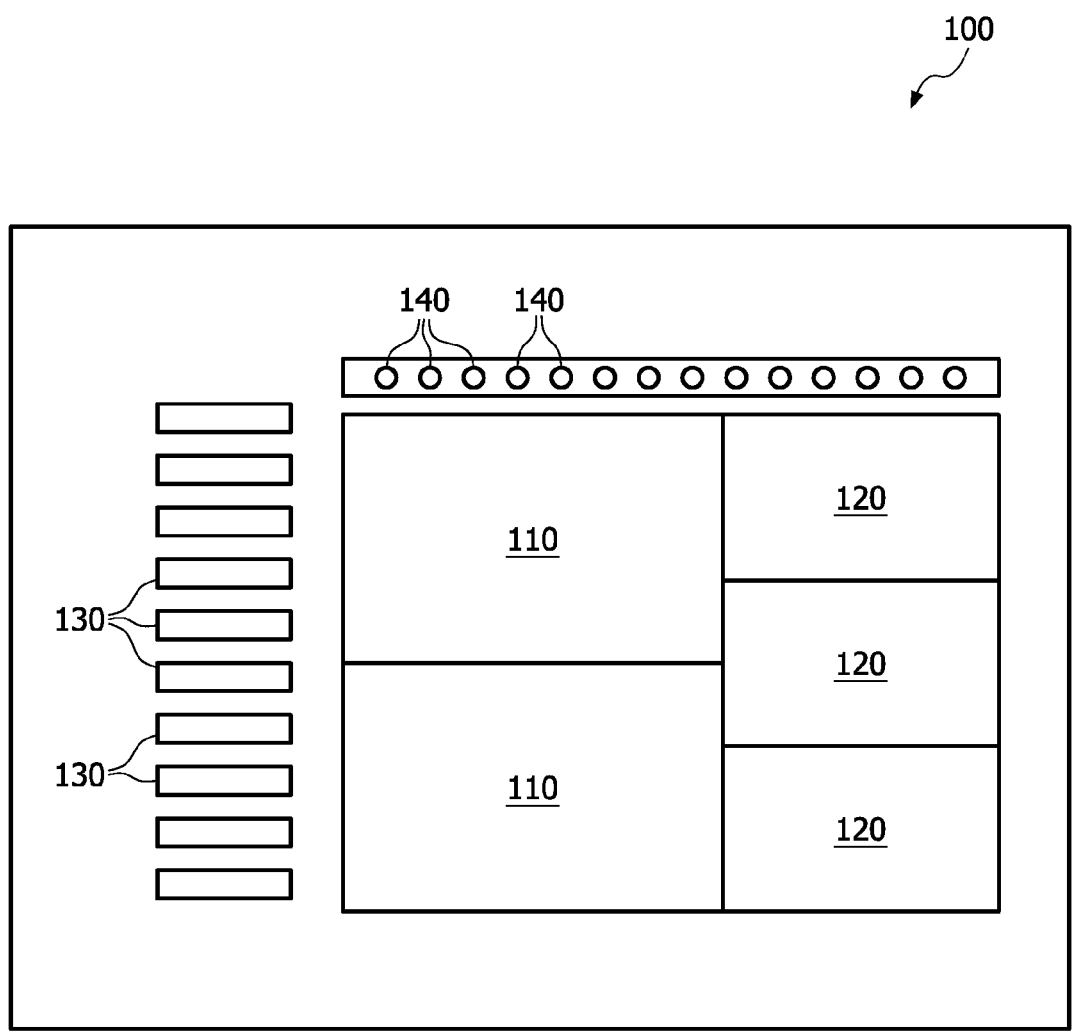
FIG. 1 is a schematic illustration of a user interface.
Figure 2:
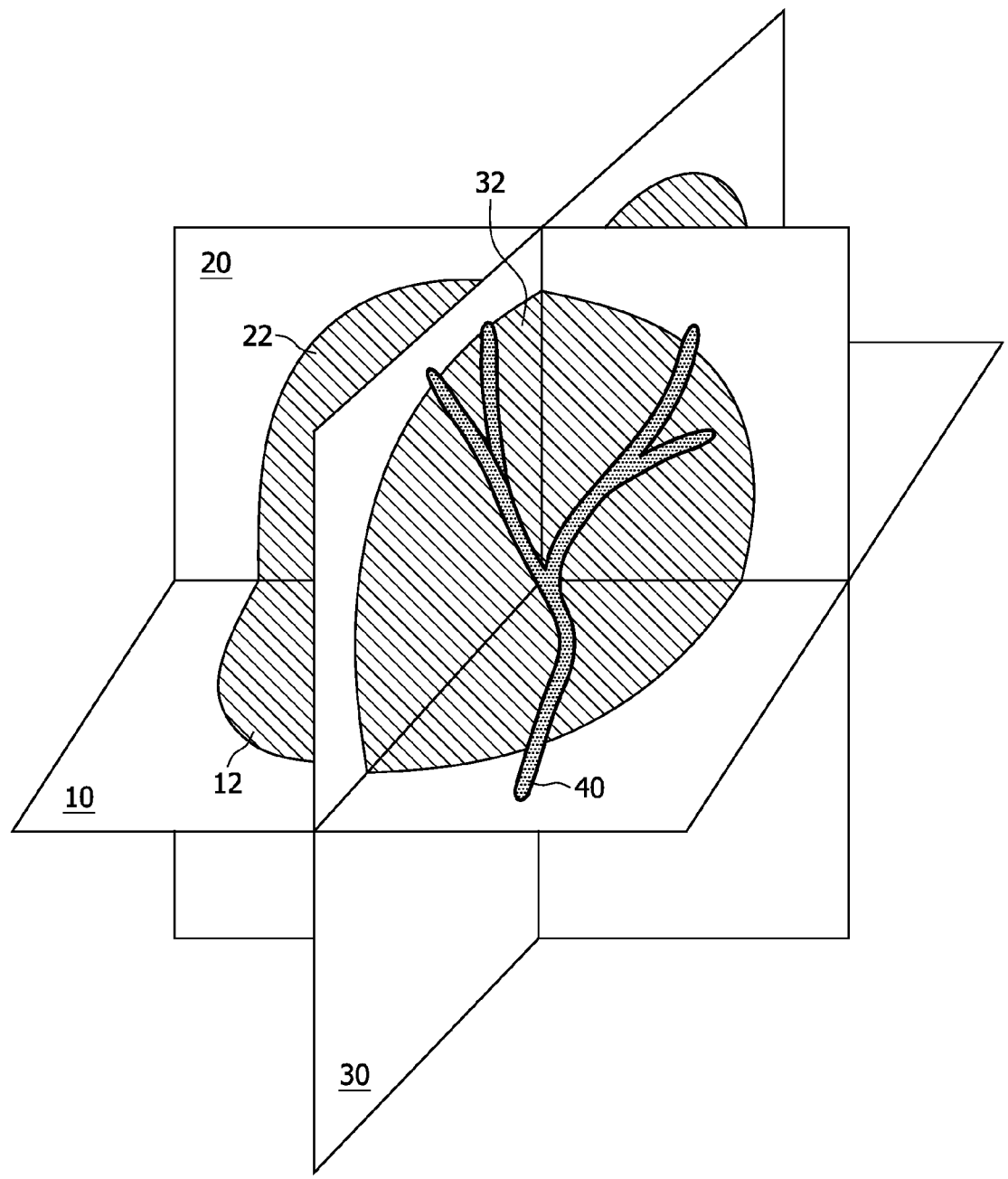
FIG. 2 is a schematic illustration of a 3D image having three opaque slices.

Referring to FIG. 2, a fused image presentation is shown. Such an image is a volume created with a 3D rotational scan, i.e. reconstructed from a series of 2D slices, on a C-arm based Xray device. 3DRX provides high contrast volumetric imaging while XperCT (or DynaCT or InnovaCT) is used for CT-like soft tissue imaging where essentially more xray dose/slices are used by a modified volume reconstructor for improved soft tissue detail. The term 3DRA is used comparable to CTA or MRA where contrast is injected during the acquisition.

In the image in FIG. 2, (segmented) 3DRA high contrast (vascular) information is overlaid with a slab through a CT/MR data set. On the one hand, there are slabs of a first data set, a horizontal slab 10, a vertical slab 20 laying in the plane of the figure, and a vertical slab 30. On each slab there is shown the respective structure 12, 22, 32 of the object of interest. But, since the slabs 10, 20, 30 are opaque, the structures 12, 22, 32 are not visible in the portions in which the slabs capture more surface as it is necessary to show the structure of the object of interest. The advantage of having high contrast on each slab brings the disadvantage of limited visibility of the structures on the respective slabs.

Additionally in FIG. 2, a vessel 40 (representing a second data set) is shown, which might be located in the upper and right quadrant of the 3D image. In case that the vessel continues into another quadrant, there will be difficulty to illustrate the hole vessel without any gabs.

In the case that the vessel can be shown directly on one of the slabs, the segmentation and isosurface presentation of the vascular information has the disadvantage that the segmentation pre-processing has to be separately calculated. Thus, said kind of illustration brings along overhead and inflexibility. Furthermore, image quality will be degraded and fine detailed information like small vessels, complex AVM or stent structures will be lost.

Considering the fact that the relevant anatomical/clinical information is mainly contained in the top slice, the presentation of thick slab is not the most effective way. A more expressive way of presenting anatomical (soft tissue) information is provided by the multi-slice presentation as offered by visualization tools like disect (DICOM imaging systems for enhanced computerized telemedicine), and 3D-slicer (Medical visualization and processing environment for research). This approach offers a simple visualization/manipulation by means of orthogonal slices and provides clear detail and position information.

A problem with existing multi-slice renderers is that, if the slices are presented opaque, large parts of the planar slabs will overlap and hide clinical information. If on the other hand the slices are displayed transparent the necessary contrast in overlapping slices will be lost.

Therefore, an apparatus for performing a fast and high quality image visualization method is proposed that allows the combination of multiple anatomical soft tissue slices with volume rendering presentations of vascular and/or interventional structures. The visualization will be based on a single or multiple registered volume acquisitions and will be execute on off the shelve consumer graphics hardware.

A solution to this problem is reported in the Journal of Magnetic Resonance Imaging, Vol. 13, pp. 967-975, June, 2001, with the title 'An Integrated Visualization System for Surgical Planning and Guidance Using Image Fusion and an Open MR'. Here MR volumetric data is segmented using the extensive set of 3D-slicer's suite of editing tools to create the boundaries of the anatomical structures. It will be clear that this segmentation method is rather complex and not easy adapted to a multi modality domain.

By implementing a multi-slice soft tissue visualization method in an apparatus according to the invention, the presentation of multiple opaque cross sectional slices will be allowed. The method will solve the problem of overwriting clinical formation without the need for implicit segmentation of clinical boundaries. In other words, a structure of interest like a vessel can be easily shown without interfering the image behind said structure.

A volume rendered presentation of the visible (middle/high) contrast information will be added, with, if requested, a transparent presentation of volume information that is hidden by the otherwise opaque slices. By means of two (window width/level) transfer functions the individual soft tissue and volume presentations can be fine-tuned on the fly. The user can directly control the way of visualization by the way of changing parameter or aspects of the image.

Finally a third volume rendered context presentation of those volume halve spaces where the camera position is not at the visible side of the planar slabs can be added. By adding a third transfer function this additional rendering will allow to add 3D context information, like skin or bone information as landmarks.

Figure 3:
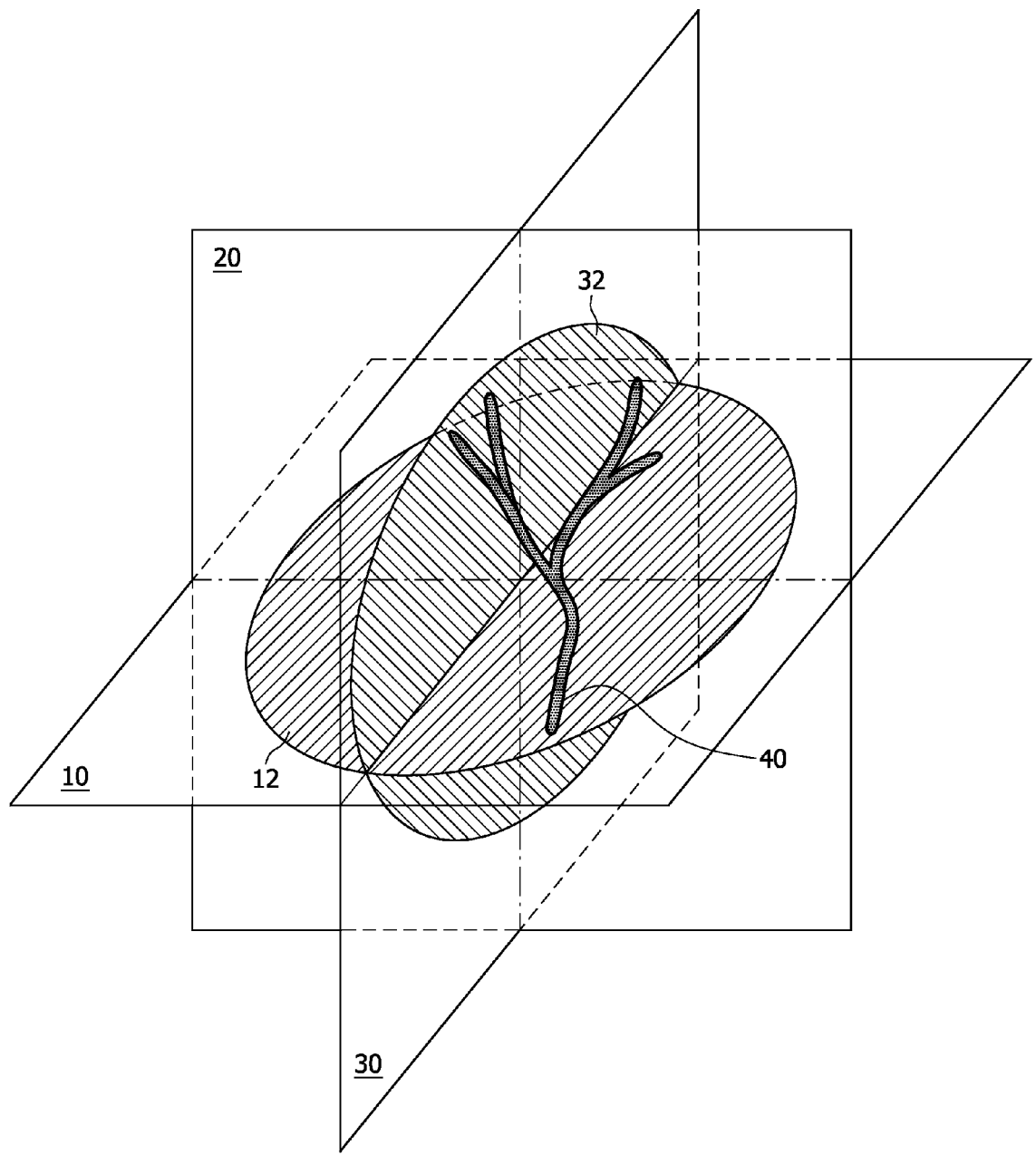
FIG. 3 is a schematic illustration of a 3D image having three transparent slices.

The user of the apparatus according to the invention can choose which structure on which slab should be visible. In FIG. 3 an example of a 3D-Visualization is shown. In this example, the user has chosen to have the structures only on the slabs 10 and 30 visible, not the structures on slab 20. Only the contour of slab 20 which is transparent, is illustrated. Additionally, in the figure, a vessel 40 is shown located substantially in the upper an right quadrant of the 3D image.

To improve the possibility to recognize details of the structures which are shown on a respective slab, the processor unit of the apparatus has automatically identified the areas on a slab which are, on the one hand, transparent since there is no structure to be shown, and which are, on the other hand, opaque to ensure a contrast which allows to locate and identify fine structure elements of the structure shown on a slab.

In this respect, a voxel is an image point on one slab. Since the slabs are orientated angularly in the 3D space, there exist areas on each slab which are spacious behind other areas. Consequently, if there are more than one slab to be shown, one slab will be partially before another slab. Thus, one voxel being on one of the slabs, can be before or behind a voxel being on the other slab. So, the voxels will have different depth information. Depending on the depth information of the voxel, the processor unit will check which voxel is in front of another voxel and, according to the check, will show only the voxel in front. For example in FIGS. 2, 3 and 4, the depth is measured perpendicular to the figure plane, into and out of the sheet of paper.

Thus, a vessel can be visualized in the context of the surrounding structure without loosing information of the structure.

Directly during an interventional procedure, the user can select parameter related to, for example, a primary volume, an overlay volume, transparent slices, lateral and axial direction, or to slice rotation.

Figure 4:
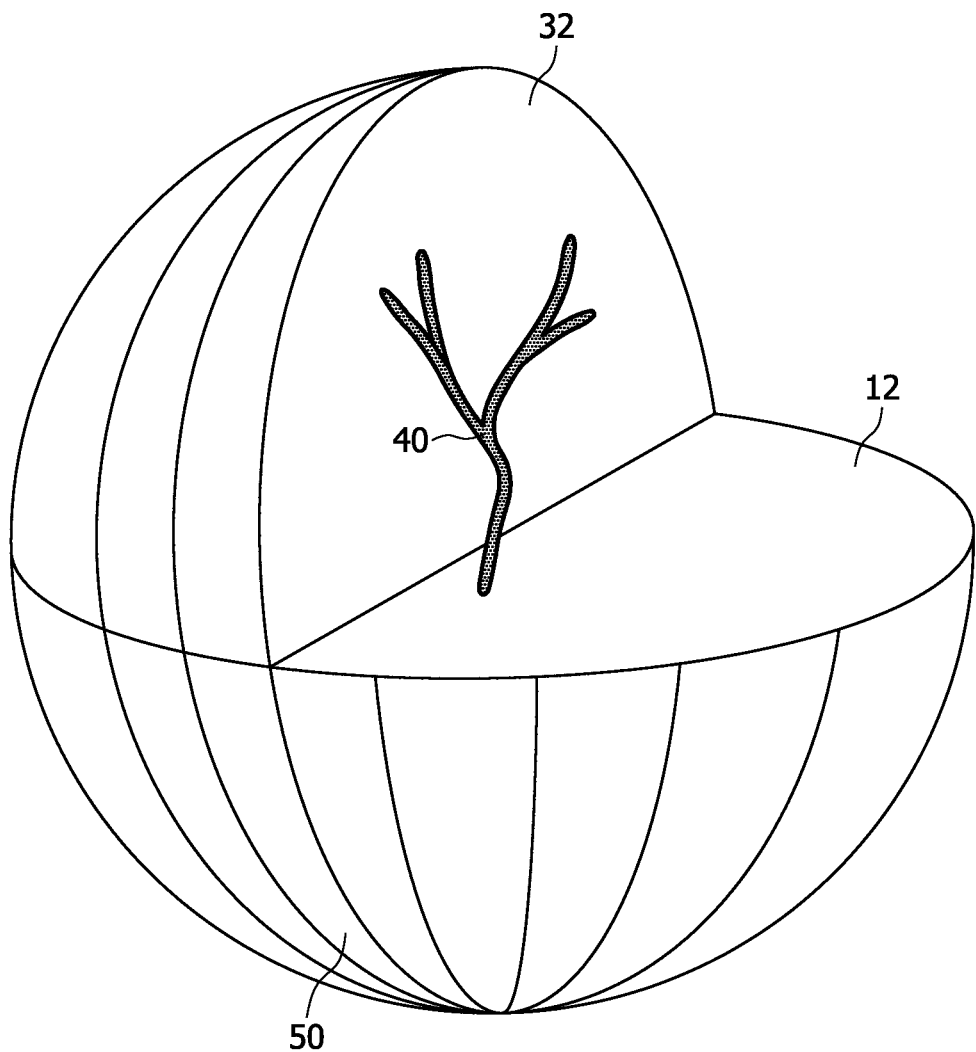
FIG. 4 is a schematic illustration of a 3D image having two slices and 3D context information.

FIG. 4 illustrates another example for an image which could be shown according to individual selection by a user, i.e. an physician. Firstly, there are shown two planes 12 and 32 of the object of interest on the respective slabs. Secondly, there is shown a 3-dimensional illustration of a vessel 40 in the correct relation to the environment. Thirdly, there is added a skin-like surface 50 surrounding the portions of the object of interest, which are not cut away to show the vessel 40. Said skin-like surface 50 might be interesting for a better orientation of interventional instruments relative to the outside of the object of interest, for example a head of a patient. Now, the user will be able to localize specific structures inside the object of interest relative to the outside skin-like surface of the object.

By selecting different transfer functions of the context volume the user can look, for example, for natural openings through bone information to plan an access path for a needle biopsy, while a different setting will reveal skin-like context information used for instance to avoid puncturing the ear.

In FIG. 4 the user of the apparatus according to the invention had chosen to omit one of the vertical slabs including the structure corresponding to said slab. Further, the slabs itself are transparent and, thus, not visible in the image. To have a good relation between the vessel 40 in relation to the surrounding structures, the angle of view is rotated to the left side of the image and to the bottom of the image. Having the skin surface visible, the user, i.e. the physician can manipulate, for example, a needle into the patient for an interventional procedure.

Figure 5:
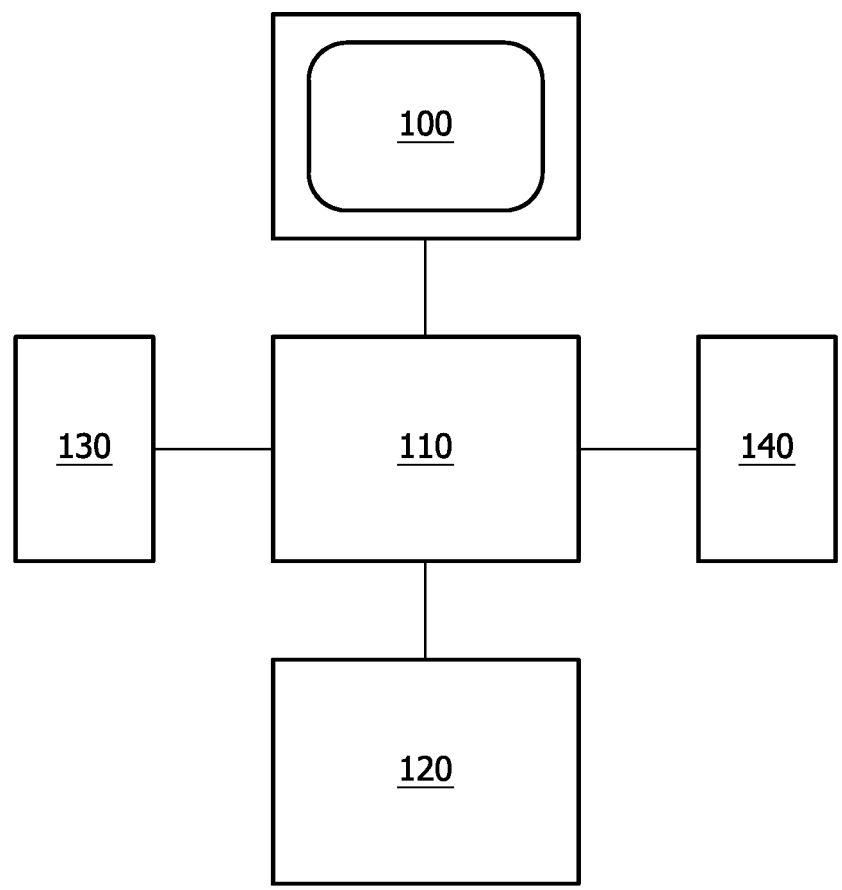
FIG. 5 is a schematic illustration of an apparatus for examination and visualization according to an exemplary embodiment of the invention.

The apparatus which will be used by the physician (user) to generate an image which will be suitable for the intended procedure, is schematically illustrated in FIG. 5. The apparatus according to an embodiment of the invention comprises a screen 100, a processor unit 110, a first data acquisition device 130, a second data acquisition device 140 and an input device 120 like a keyboard or a computer mouse. The input device is provided to select the parameter related to the different aspects of the image which will be calculated and rendered by means of the processor unit 110 and will be illustrated on the screen 100. By means of the data acquisition devices 130 and 140 the data sets like CT, MR, 3DRX or CT-like data sets which will provide the basis for the illustrated images, can be loaded and saved. On the basis of said data sets as well as on the chosen parameter, the processor unit will calculate and render the areas of the object of interest which the user wants to see. Subsequently, the rendered image will be illustrated on the screen 100.

Figure 6:
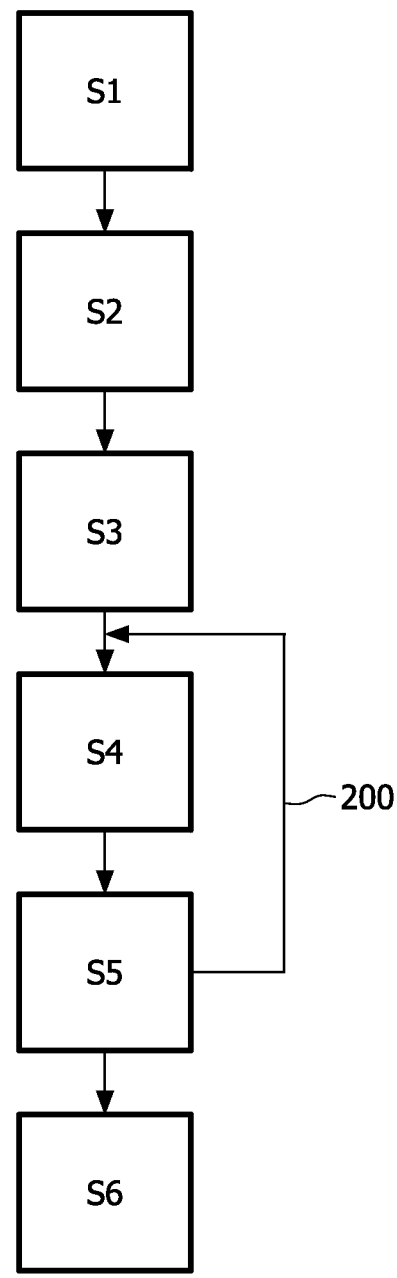
FIG. 6 is a diagram showing steps of a method for using an apparatus according to an exemplary embodiment of the invention.

The single steps of the method which is performed to achieve images with an improved applicability, are shown in FIG. 6. Step S1 is the acquisition of the first data set. For example, the data generated by scanning a patient in a C-arm based Xray device, will be loaded by means of the first acquisition device 130. Step S2 is the acquisition of a second data set. Here, a data set can be loaded which was previously generated, for example, by means of a MR system. Step S3 is the fusion of the two data sets. The fusion of the data sets will make sure that the two data sets, i.e. the respective scanned structures, will be congruent. As a result, the position of each structure element of the object of interest will be the same in both data sets and, thus, the user can change between the data sets for each structure element and combine structures in a single image without loosing the advantages of different scanning systems.

In other words, the step S3 is the combining of live interventional projection information with high density volume and sliced soft tissue volume information, which is clinically relevant during various interventional procedures. For instance, during treatment of AVM where the progression of the glue is (only) visible in the fluoro projections and the target area of the malformation (only) in the cross-sectional slices.

Step S4 is the interaction of the user, i.e. the physician. According to the intervention the user intents to perform, the user will choose or select the parameter which will be presumably useful in the interventional procedure. In step S5 the image will be illustrated on the screen. During the interventional procedure, it might be of interest to change the parameter related to the different aspect of the image. On the fly, it is possible to change the selected parameters and substitute them with other parameters. This aspect is diagrammatically shown in FIG. 6 through the arrow 200. Step S6 symbolizes the termination of the method.

In the following, it will be described in detail how to build and use the invention.

Based on a general notice of their plane equations multiple (up to three), (not necessarily) orthogonal cross sectional slices thru the soft tissue volume are defined.

Using a GPU hardware hidden surface algorithm pixels are overwritten by slices that are closer to the viewer. The hardware depth buffer can be used to determine whether a given pixel of an object is in front of or behind the corresponding pixel recorded in the frame buffer. In this way by comparing the current with the recorded depth values the application is able to render objects in any order, with visibility determined pixel by pixel.

Using the current (rigid) registration and viewing/projection transformations together with the slab transfer function for each of the enabled slices a (one voxel) cross sectional slice thru the soft tissue volume data is resampled and projected to screen space. Based on the resampled voxel information a stencil mask, with a unique label value for each enables slice is determined for those pixels (projected voxels) with a density greater that zero. During this process the color buffer will be disabled so that the imaging will only have its effect on the stencil and depth buffers. Using standard GPU hardware supported stencil buffer functionality this process is effectively described in standard 3D functionality like direct3D or openGL as:

```
(1) glEnable(GL_STENCIL_TEST);                          // enable stenciling
    glClear(GL_STENCIL_BUFFER_BIT);                     // clear stencilbuffer
    glColorMask(FALSE,FALSE,FALSE,FALSE);               // disable colorbuffer
    glEnable(GL_ALPHA_TEST);                            // enable alpha test
    glAlphaFunc(GL_GREATER, 0.0f);                      // pass alpha > 0
    glEnable(GL_DEPTH_TEST);                            // enable depth buffer test
    glStencilOp(GL_KEEP, GL_KEEP, GL_REPLACE);          // stencil parameters
    for all slices:
      if enabled(slice):
        glStencilFunc(GL_NOTEQUAL, mask(slice), ALL);   // stencil operation draw(slice)
```

In the rendering pseudo code examples the openGL syntax is used.

Using the hidden surface algorithm the stencil values are overwritten by nearby slices.

Now by using the stencil buffer, based on the current slab thickness and slice render option (by default a slice averaging MPR), the enabled slices are rendered by means of direct volume rendering using the slice label value as stencil value:

```
(2) glEnable(GL_STENCIL_TEST);                          // enable stencilling
    glDisable(GL_ALPHA_TEST);                           // disable alphatest
    glDisable(GL_DEPTH_TEST);                           // enable depth buffer test
    glColorMask(TRUE,TRUE,TRUE,TRUE);                   // enable colorbuffer
    glStencilOp(GL_KEEP, GL_KEEP, GL_KEEP);             // stencil parameters
    loadSliceTransferFunction(( );
    for all slices:
      if enabled(slice):
        glStencilFunc(GL_EQUAL, mask(slice), ALL_BITS); // stencil operation
        draw(slice, thickness, sliceRenderOption);
```

In the next step the contrast volume information can be visualized by means of direct volume rendering using the alpha test and the z-buffer Hardware so that the slices are overwritten with high contrast information for those voxel which have a minimum density and which are a the pixel level closer to the viewer than existing information:

```
(3) glEnable(GL_STENCIL_TEST);                              // enable stencilling
    glEnable(GL_ALPHA_TEST);                                // enable alpha test
    glAlphaFunc(GL_GREATER, 0.0f);                          // pass alpha > 0
    glEnable(GL_DEPTH_TEST);                                // enable depth buffer test
    glColorMask(TRUE,TRUE,TRUE,TRUE);                       // enable colorbuffer
    glStencilMask(STENCILMASK_CONTRAST);                    // affected stencil bits
    glStencilOp(GL_KEEP, GL_KEEP, GL_REPLACE);              // stencil parameters
    glStencilOp(GL_ALWAYS, STENCILMASK_CONTRAST,0);         // stencil operation
    loadContrastTransferFunction( );
    drawContrastVolume(contrastRenderOption)
```

As mentioned before in some situations the user like to be able to look through the transparent slice(s) to the contrast information. While dedicated volume rendering hardware is reported that allows real blending of volumes at the voxel level, the hidden surface technique that is provided by consumer graphics GPU hardware to solve the depth relation, only works correct for randomly ordered objects when the objects are opaque. With translucent objects that obscure each other the application must find a way to draw the objects in a back to front order which is in a general not a trivial job.

In this specific case the translucent slices can be visualized as follows:

After set up of the stencil buffer and before the transparent soft tissue slices are drawn, the contrast information that is situated behind the active slices is rendered. This can be done in a multi-pass rendering step using the top-level planes of the enabled slices as clipping planes.

By using a stencil setup that enables all enabled slices, the obscured contrast voxels can be rendered more effectively in one direct volume rendering pass by changing the Z-buffer depth test to allow those pixels (projected voxels) to pass that are further away than the existing slices.

During this operation the depth buffer is write protected so that the slice information is not overwritten by contrast volume data. In order to activate all enabled slices the logical AND of the enabled slice masks (SLICE_BASE) is taken.

```
(4) glEnable(GL_STENCIL_TEST);                              // enable stencilling
    glEnable(GL_ALPHA_TEST);                                // enable alpha test
    glAlphaFunc(GL_GREATER, 0.0f);                          // pass alpha > 0
    glEnable(GL_DEPTH_TEST);                                // enable depth buffer test
    glStencilOp(GL_KEEP, GL_KEEP, GL_KEEP);                 // stencil parameters
    glStencilFunc(GL_EQUAL, SLICE_BASE, SLICE_BASE);        // stencil operation
    gl|DepthFunc(GL_GREATER);                               // invert depth test
    glDepthMask(false);                                     // write protect depth buffer
    loadContrastTransferFunction( );
    DrawContrastVolume(contrastRenderOption);
```

On request the context information is added.

In order to limit the enabled slices as rendered, the stencil initialisation part is preceded by the clip plane(s) setup, in which hardware provided clip plane(s) are used to pass the frontside (same side as viewer) of the slabs.

```
(0) for all slices:
       if enabled(slice):
    setClipPlane(frontside, slice)
    Finally the volume information is added:
(5) glEnable(GL_STENCIL_TEST);                              // enable stencilling
    glEnable(GL_ALPHA_TEST);                                // enable alpha test
    glAlphaFunc(GL_GREATER, 0.0f);                          // pass alpha > 0
    glEnable(GL_DEPTH_TEST);                                // enable depth buffer test
    glStencilOp(GL_KEEP, GL_KEEP, GL_REPLACE);              // stencil parameters
    glStencilFunc(GL_ALWAYS, SLICE_MASK_CONTEXT, 0);        // stencil operation
    loadSkinTransferFunction( );
    for all slices:
    if enabled(slice):
    setClipPlane(frontSide, slice)
    DrawContextVolume(VOLUME_RENDERED)
    setClipPlane(backSide,slice)
```

Note that by adding the (volume rendered) context information, areas of very low (zero) density, that will be fully transparent, will provide local 3D volume context information. In this way additional 3D inside is provided in areas like spinal or neural cavities (sinus, nasal, mouth, oral, middle ear etc.).

All passes of the visualization method as outlined above are implemented on consumer graphics hardware, employing the GPU, which leads to high frame rates and thus enables interactive manipulation.

In order to support graphical selection of the individual slabs an approach according to another embodiment might be to project the screen space selection point onto the enabled slice plane equations in patient space to find out the closest intersection in the eye coordinate space. This does not work however due to the fact that the plane equation extents over the boundary of anatomical structures.

A better and simpler approach is to use a stencil buffer readback:

```
selected_slice= not_found;
glReadPixels(pnt.x, pnt.y, 1, 1, GL_STENCIL_INDEX,GL_UNSIGNED_BYTE, &stencilVal);
for all slices:
if ((stencilVal& SLICE_MASK)== mask(slice)) selected_slice= slice;
```

In this way individual slabs can be picked/selected by a simple click and moved by the user along their normals showing different parts of the anatomical data sets.

By indication and selection of a slab rotation point graphic the slabs can be rotated.

Another way of looking at extending the slices with multi modality context information, is that of a multi-modality volume that is locally opened-up to provide the user with internal vascular/interventional and soft tissue information.

In a further embodiment the display process is implemented in an interventional context, where real-time interventional 2D fluoro data is aligned, either with 3D/3D or 2D/3D registration and projected over 3D vascular and/or anatomical information. Now by positioning the cross sectional slices in the neighborhood of the interventional tooltips (biopsy needle, guidewire etc.) the 3D volume is effectively opened up and the user is provided with 3D multi modality contextual information.

During the presentation of the interventional information in the 2D fluoro projections, the position of the cross-sectional slices can be either user selected or automatic determined by 3D localisation of the tip of the interventional tools. The orientation of cross-sectional slices can be fixed orthogonal (AP, AXIAL, and LATERAL) or user selected. In another configuration the orientation can be coupled to the current C-arm orientation. In this setup one plane is orthogonal to the viewing direction, while the two other (non orthogonal) planes are rotated or angulated relative to this orientation by a user selectable amount between (0 and 180) degrees.

While the invention has been illustrated and described in detail in the drawings and foregoing description, such illustration and description are to be considered illustrative or exemplary and. not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus for examining with an interventional tool and visualizing an object of interest, the apparatus comprising a display, an input device, and a calculation unit, the apparatus configured for performing the following steps:

acquiring a first data set;

acquiring a second data set;

fusing the first and second data sets;

determining image parameters entered from the input device, related to at least one of an image plane, an angle of view, a contrast and a transparency; and rendering an image on the basis of the data sets and the determined parameters, resulting in a combined image with selected areas of transparency and selected areas of visible contrast information, wherein the image is visualized on the display;

wherein the rendering of an image comprises setting up a stencil buffer that enables all enabled slices;

rendering contrast information that is situated behind an active slice by changing a Z-buffer depth test to allow those pixels to pass that are further away than the existing slices, and write-protecting a depth buffer corresponding to the stencil buffer;

drawing transparent soft tissue slices;

adding volume rendered context information, wherein areas of zero density that are transparent provide local 3D volume context information, thereby providing 3D interior to cavities, and wherein the volume rendered context information is added with a transparent presentation of volume information that is hidden by otherwise opaque slices using two window width/level transfer functions;

using a third volume rendered context presentation of skin and bone landmarks wherein volume halve spaces having a camera position that is not at the visible side of the slab are added to the 3D context information;

adding a skin-like surface surrounding the portions of the object of interest which are not cut away;

displaying real-time interventional 2D fluoro data and registering and projecting the real-time interventional 2D fluoro data over 3D vascular or anatomical information of the image; and coupling the orientation of the image to the orientation of the real-time interventional 2D fluoro data;

wherein the active slice is selected by a single click and moved along its normal to show different parts of the real-time interventional 2D fluoro data, and wherein the active slice can be rotated by selection of a rotation point graphic;

wherein the position of the slices is user selected or determined by 3D localization of the tip of an interventional tool; and thereby creating a high contrast, real time medical image having fully transparent zero density regions that allows the interventional tool to be guided through the fully transparent regions while avoiding regions of less transparency.

2. The apparatus of claim 1, wherein the first data set is selected from the group consisting of CT, 3DRX and CT-like.

3. The apparatus of claim 1, wherein the second data set is selected from the group consisting of CT, 3DRX and CT-like.

4. The apparatus of claim 1, wherein the transparency and the contrast information of the image areas depend on the depth information of a respective voxel information.

5. A method for examining with an interventional tool and visualizing an object of interest, the method comprising:
   acquiring a first data set;
   acquiring a second data set;
   fusing the first and second data sets;
   choosing image parameters related to at least one of an image plane, an angle of view, a contrast and a transparency; and
   rendering an image on the basis of the data sets and the chosen parameters, resulting in a combined image with selected areas of transparency and selected areas of visible contrast information;
   wherein the rendering of an image comprises
   setting up a stencil buffer that enables all enabled slices;
   rendering contrast information that is situated behind an active slice by changing the Z-buffer depth test to allow those pixels to pass that are further away than the existing slices, and write-protecting a depth buffer corresponding to the stencil buffer;
   drawing transparent soft tissue slices; and
   adding volume rendered context information, wherein areas of zero density that are transparent provide local 3D volume context information, thereby providing 3D interior to cavities, and wherein the volume rendered context information is added with a transparent presentation of volume information that is hidden by otherwise opaque slices using two window width/level transfer functions;
   using a third volume rendered context presentation of skin and bone landmarks wherein volume halve spaces having a camera position that is not at the visible side of the slab are added to the 3D context information
   adding a skin-like surface surrounding the portions of the object of interest which are not cut away;
   displaying real-time interventional 2D fluoro data and registering and projecting the real-time interventional 2D fluoro data over 3D vascular or anatomical information of the image; and
   coupling the orientation of the image to the orientation of the real-time interventional 2D fluoro data;
   wherein the active slice is selected by a single click and moved along its normal to show different parts of the real-time interventional 2D fluoro data, and wherein the active slice can be rotated by selection of a rotation point graphic;
   wherein the position of the slices is user selected or determined by 3D localization of the tip of an interventional tool; and thereby creating a high contrast, real time medical image having fully transparent zero density regions that allows the interventional tool to be guided through the fully transparent regions while avoiding regions of less transparency.

6. The method of claim 5, wherein each data set is selected from the group consisting of CT, 3DRX and CT-like.

7. The method of claim 5, wherein the transparency and the contrast information of the image areas depend on the depth information of respective voxel.

8. A computer program product comprising code instructions stored in a non-transitory tangible computer readable medium, wherein the instructions carry out a method for controlling an apparatus for examining with an interventional tool and visualizing an object of interest, wherein data, acquired from a CT system, are processed to generate an image of the object of interest, the method comprising:
   acquiring a first data set;
   acquiring a second data set;
   fusing the first and second data sets;
   choosing image parameters related to at least one of an image plane, an angle of view, a contrast and a transparency; and
   rendering an image on the basis of the data sets and the chosen parameters, resulting in a combined image with selected areas of transparency and selected areas of visible contrast information;
   wherein the rendering of an image comprises
   setting up a stencil buffer that enables all enabled slices;
   rendering contrast information that is situated behind an active slice by changing the Z-buffer depth test to allow those pixels to pass that are further away than the existing slices, and write-protecting a depth buffer corresponding to the stencil buffer;
   drawing transparent soft tissue slices; and
   adding volume rendered context information, wherein areas of zero density that are transparent provide local 3D volume context information, thereby providing 3D interior to cavities, and wherein the volume rendered context information is added with a transparent presentation of volume information that is hidden by otherwise opaque slices using two window width/level transfer functions;
   using a third volume rendered context presentation of skin and bone landmarks wherein volume halve spaces having a camera position that is not at the visible side of the slab are added to the 3D context information
   adding a skin-like surface surrounding the portions of the object of interest which are not cut away;
   displaying real-time interventional 2D fluoro data and registering and projecting the real-time interventional 2D fluoro data over 3D vascular or anatomical information of the image; and
   coupling the orientation of the image to the orientation of the real-time interventional 2D fluoro data;
   wherein the active slice is selected by a single click and moved along its normal to show different parts of the real-time interventional 2D fluoro data, and wherein the active slice can be rotated by selection of a rotation point graphic;
   wherein the position of the slices is user selected or determined by 3D localization of the tip of an interventional tool; and thereby creating a high contrast, real time medical image having fully transparent zero density regions that allows the interventional tool to be guided through the fully transparent regions while avoiding regions of less transparency.

* * * * *